(12) United States Patent
Seo

(10) Patent No.: US 10,158,472 B2
(45) Date of Patent: Dec. 18, 2018

(54) METHOD FOR TRANSMITTING CHANNEL STATE INFORMATION REPORT AND USER EQUIPMENT, AND METHOD FOR RECEIVING CHANNEL STATE INFORMATION REPORT AND BASE STATION

(71) Applicant: LG ELECTRONICS INC., Seoul (KR)

(72) Inventor: Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 478 days.

(21) Appl. No.: 14/381,517

(22) PCT Filed: Feb. 27, 2013

(86) PCT No.: PCT/KR2013/001589
§ 371 (c)(1),
(2) Date: Aug. 27, 2014

(87) PCT Pub. No.: WO2013/129843
PCT Pub. Date: Sep. 6, 2013

(65) Prior Publication Data
US 2015/0049689 A1 Feb. 19, 2015

Related U.S. Application Data

(60) Provisional application No. 61/604,475, filed on Feb. 28, 2012, provisional application No. 61/621,000, filed on Apr. 6, 2012.

(51) Int. Cl.
*H04L 5/00* (2006.01)
*H04L 27/26* (2006.01)

(52) U.S. Cl.
CPC ............ *H04L 5/0053* (2013.01); *H04L 5/005* (2013.01); *H04L 5/0057* (2013.01);
(Continued)

(58) Field of Classification Search
CPC ... H04W 72/044; H04W 24/10; H04W 24/00; H04W 28/04; H04W 92/20; H04W 48/16;
(Continued)

(56) References Cited

U.S. PATENT DOCUMENTS

2011/0044250 A1   2/2011   Han et al.
2011/0116437 A1   5/2011   Chen et al.
(Continued)

FOREIGN PATENT DOCUMENTS

KR   10-2011-0095060 A   8/2011
WO   WO 2011/062921 A1   5/2011
(Continued)

OTHER PUBLICATIONS

3GPP TS 36.213 V10.4.0 (Dec. 2011);3rd Generation Partnership Project; Technical Specification Group Radio Access Network; Evolved Universal Terrestrial Radio Access (E-UTRA); Physical layer procedures, (Release 10).*
(Continued)

*Primary Examiner* — Andrew Lai
*Assistant Examiner* — Hoyet H Andrews
(74) *Attorney, Agent, or Firm* — Birch, Stewart, Kolasch & Birch, LLP

(57) ABSTRACT

The user equipment and the base station according to the present invention determine differently whether a downlink subframe is a valid reference resource for a channel state information report, in accordance with whether an interference measurement resource is explicitly configured to the user equipment.

6 Claims, 9 Drawing Sheets

(52) U.S. Cl.
CPC ........ *H04L 5/0073* (2013.01); *H04L 27/2601* (2013.01); *H04L 5/0023* (2013.01); *H04L 5/0035* (2013.01); *H04L 5/0078* (2013.01)

(58) Field of Classification Search
CPC . H04W 24/08; H04W 72/085; H04W 76/046; H04J 11/0056; H04J 13/0062; H04L 5/0091; H04L 5/0073; H04L 5/0053; H04L 5/0048; H04L 5/0023; H04L 1/0026; H04L 25/0204; H04B 7/0626; H04B 7/024

See application file for complete search history.

(56) References Cited

U.S. PATENT DOCUMENTS

| | | | | |
|---|---|---|---|---|
| 2011/0188481 | A1* | 8/2011 | Damnjanovic | H04W 72/04 370/336 |
| 2011/0200137 | A1 | 8/2011 | Han et al. | |
| 2012/0176925 | A1* | 7/2012 | Hwang | H04W 24/10 370/252 |
| 2012/0307660 | A1* | 12/2012 | Lindoff | H04W 24/10 370/252 |
| 2013/0033998 | A1 | 2/2013 | Seo et al. | |
| 2013/0094411 | A1 | 4/2013 | Zhang | |

FOREIGN PATENT DOCUMENTS

| | | | | |
|---|---|---|---|---|
| WO | WO 2011062921 | A1 * | 5/2011 | ........... H04B 7/0689 |
| WO | WO2011062921 | A1 * | 5/2011 | |
| WO | WO 2011/103309 | A2 | 8/2011 | |
| WO | WO 2011/122833 | A2 | 10/2011 | |

OTHER PUBLICATIONS

3GPP TR 36.819 V11.1.0 (Dec. 2011);3rd Generation Partnership Project; Technical Specification Group Radio Access Network; Coordinated multi-point operation for LTE physical layer aspects (Release 11).*

3GPP TS 36.213 V10.4.0 (Dec. 2011), titled "3rd Generation Partnership Project; Technical Specification Group Radio Access Network; Evolved Universal Terrestrial Radio Access (E-UTRA); Physical layer procedures (Release 10)", (TS 36.213 hereinafter) was published Dec. 2009, pp. 01-48.*

R1-114352, 3GPP TSG RAN WG1 Meeting #67, San Francisco, USA, Nov. 14-18, 2011, Agenda item 3, Title: "Final Report of 3GPP TSG RAN WG1 #66bis v1.1.0 (Zhuhai, P. R. China, Oct. 10-14, 2011)", Document for: Approval, Source: MCC Support.*

R1-113015, 3GPP TSG RAN WG1 Meeting #66bis, Zhuhai, China, Oct. 10-14, 2011, Source: ZTE, Title: "Consideration on downlink control signaling configuration for CoMP", Agenda Item: 7.5.3.2, Document for: Discussion and Decision.*

R1-114352, 3GPP TSG RAN WG1 Meeting #67, San Francisco, USA, Nov. 14-18, 2011, Agenda item 3, Title: "Final Report of 3GPP TSG RAN WG1 #66bis v1.1.0 (Zhuhai, P. R. China, Oct. 10-14, 2011)", Document for: Approval, Source.*

R1-120756, authored by Fujitsu for 3GPP TSG-RAN WG1 #68, (hereinafter R1-120756) titled, "CSI-RS Patterns for Interference Measurements for CoMP", Agenda Item: 7.5.2, Dresden, Germany, Feb. 6-10, 2012, pp. 1-8.*

* cited by examiner

: CRS for antenna port p (p∈0, p∈0,1 or p∈0,1,2,3)

METHOD FOR TRANSMITTING CHANNEL STATE INFORMATION REPORT AND USER EQUIPMENT, AND METHOD FOR RECEIVING CHANNEL STATE INFORMATION REPORT AND BASE STATION

CROSS REFERENCE TO RELATED APPLICATIONS

This application is the National Phase of PCT/KR2013/001589 filed on Feb 27, 2013, which claims priority under 35 U.S.C. 119(e) to U.S. Provisional Application No. 61/604,475filed on Feb. 28, 2012 and to U.S. Provisional Application No. 61/621,000 filed on Apr. 6, 2012, all of which are hereby expressly incorporated by reference into the present application.

TECHNICAL FIELD

The present invention relates to a wireless communication system and, more particularly, to a method and apparatus for transmitting or receiving channel state information.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed. In addition, a communication environment has evolved into increasing density of nodes accessible by a user at the periphery of the nodes. A node refers to a fixed point capable of transmitting/receiving a radio signal to/from a user equipment through one or more antennas. A communication system including high-density nodes may provide a better communication service to the user through cooperation between the nodes.

Such a multi-node cooperative communication scheme in which a plurality of nodes performs communication with the UE using the same time-frequency resource has much better performance in data throughput than a conventional communication scheme in which the nodes perform communication with the UE without any cooperation by operating as independent eNBs.

A multi-node system performs cooperative communication using a plurality of nodes, each node operating as an eNB, an access point, an antenna, an antenna group, a radio remote header (RRH), or a radio remote unit (RRU). In addition, even though a plurality of nodes does not directly participate in signal transmission or signal reception simultaneously, since the nodes are capable of performing signal transmission/reception while reducing mutual interference therebetween, overall system throughput can be raised.

Unlike a conventional centralized antenna system in which antennas converge upon an eNB, the nodes are typically separated from each other by a predetermined interval or more in the multi-node system. The nodes may be managed by one or more eNBs or eNB controllers for controlling the operation thereof or scheduling data transmission/reception therethrough. Each node is connected to the eNB or eNB controller for managing the node through a cable or a dedicated line.

Such a multi-node system may be regarded as a type of MIMO system in that distributed nodes are capable of communicating with a single or multiple UEs by simultaneously transmitting/receiving different streams. However, since the multi-node system transmits signals using nodes distributed at various locations, a transmission region which should be covered by each antenna decreases in comparison with antennas included in the conventional centralized antenna system. Accordingly, compared with a conventional system implementing MIMO technology in the centralized antenna system, a transmit power needed when each antenna transmits a signal may be reduced in the multi-node system. In addition, since the transmission distance between an antenna and a UE is shortened, path loss is reduced and high-speed data transmission is achieved. Therefore, transmission capacity and power efficiency of a cellular system can be enhanced and relatively uniform quality of communication performance can be satisfied irrespective of the locations of UEs in a cell. Furthermore, in the multi-node system, since an eNB(s) or eNB controller(s) connected to multiple nodes performs cooperative data transmission/reception, signal loss generated in a transmission process is reduced. In addition, when nodes distant from each other by a predetermined distance or more perform cooperative communication with the UE, correlation and interference between antennas are reduced. Hence, according to the multi-node cooperative communication scheme, a high signal to interference-plus-noise ratio (SINR) can be achieved.

Due to such advantages of the multi-node system, in the next-generation mobile communication system, the multi-node system has emerged as a new basis of cellular communication through combination with or by replacing conventional centralized antenna systems in order to reduce additional installation costs of an eNB and maintenance costs of a backhaul network and simultaneously to expand service coverage and enhance channel capacity and SINR.

DETAILED DESCRIPTION OF THE INVENTION

Technical Problems

To accurately receive a signal between a node and a user equipment, a channel state formed between the node and the user equipment needs to be reported to an eNB or an eNB controller. Since communication up to now has been mainly performed between a single node and the user equipment, a scheme in which the user equipment reports the channel state has also been established based on the single node. For a situation in which a plurality of nodes coordinate provision of a communication service to the user equipment or for avoidance of mutual interference of the nodes, a new channel state reporting scheme considering the coordinated situation is needed.

The technical objects that can be achieved through the present invention are not limited to what has been particularly described hereinabove and other technical objects not described herein will be more clearly understood by persons skilled in the art from the following detailed description.

Technical Solutions

The present invention provides a method and apparatus for differently determining whether a downlink subframe is valid for a reference resource for reporting channel state information according to whether an interference measurement resource is explicitly configured for a user equipment.

In an aspect of the present invention, provided herein is a method for transmitting channel state information (hereinafter, CSI) reporting by a user equipment, including calculating CSI based on a downlink subframe when the downlink subframe is valid for a CSI reference resource; and transmitting the CSI, wherein, if the downlink subframe is a multimedia broadcast single frequency network (MBSFN) subframe, the downlink subframe is considered to be valid or invalid for the CSI reference resource according to whether the user equipment is configured to receive information about an interference measurement resource.

In another aspect of the present invention, provided herein is a user equipment for transmitting channel state information (hereinafter, CSI) reporting, including a radio frequency (RF) unit; and a processor configured to control the RF unit, wherein the processor is configured to calculate CSI based on a downlink subframe when the downlink subframe is valid for a CSI reference resource and controls the RF unit to transmit the CSI, and if the downlink subframe is a multimedia broadcast single frequency network (MBSFN) subframe, the processor is configured to determine that the downlink subframe is valid or invalid for the CSI reference resource according to whether the user equipment is configured to receive information about an interference measurement resource.

In another aspect of the present invention, provided herein is base station for receiving channel state information (hereinafter, CSI) reporting, including a radio frequency (RF) unit and a processor configured to control the RF unit, wherein the processor is configured to control the RF unit to receive the CSI in an uplink subframe, if a downlink subframe associated with the uplink subframe is a multimedia broadcast single frequency network (MBSFN) subframe, the processor is configured to determine whether the downlink subframe is valid or invalid for a CSI reference resource according to whether information about an interference measurement resource is transmitted to a user equipment, and if the downlink subframe is valid for the CSI reference resource, the processor is configured to assume that the CSI is calculated based on the downlink subframe.

In another aspect of the present invention, provided herein is base station for receiving channel state information (hereinafter. CSI) reporting, including a radio frequency (RF) unit and a processor configured to control the RF unit, wherein the processor is configured to control the RF unit to receive the CSI in an uplink subframe, if a downlink subframe associated with the uplink subframe is a multimedia broadcast single frequency network (MBSFN) subframe, the processor is configured to determine whether the downlink subframe is valid or invalid for a CSI reference resource according to whether information about an interference measurement resource is transmitted to a user equipment, and if the downlink subframe is valid for the CSI reference resource, the processor is configured to assume that the CSI is calculated based on the downlink subframe.

In each aspect of the present invention, the MBSFN subframe may not include a cell-specific reference signal (CRS) on OFDM symbols other than first two OFDM symbols.

In each aspect of the present invention, the interference measurement resource may be configured with a specific period corresponding to a plurality of subframes.

In each aspect of the present invention, the user equipment may be configured with a transmission mode for demodulating downlink data based on the CRS.

In each aspect of the present invention, if the information about the interference measurement resource is transmitted to the user equipment, the MBSFN subframe may be considered to be valid for the CSI reference resource.

In each aspect of the present invention. If the downlink subframe includes the interference measurement resource, the downlink subframe may be considered to be valid for the CSI reference resource.

In each aspect of the present invention, if the CSI reporting is periodic CSI reporting, the downlink subframe may be considered to be valid for the CSI reference resource when the downlink subframe includes the interference measurement resource and the downlink subframe may be considered to be invalid for the CSI reference resource when the downlink subframe does not include the interference measurement resource.

In each aspect of the present invention, if the CSI reporting is aperiodic CSI reporting, the downlink subframe may be considered to be valid for the CSI reference resource even when the downlink subframe does not include the interference measurement resource The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, accuracy of channel state information reporting in a multi-cell environment can be ensured.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 7 is a diagram for explaining embodiments of the present invention.

MODE FOR INVENTION

Figure 1:
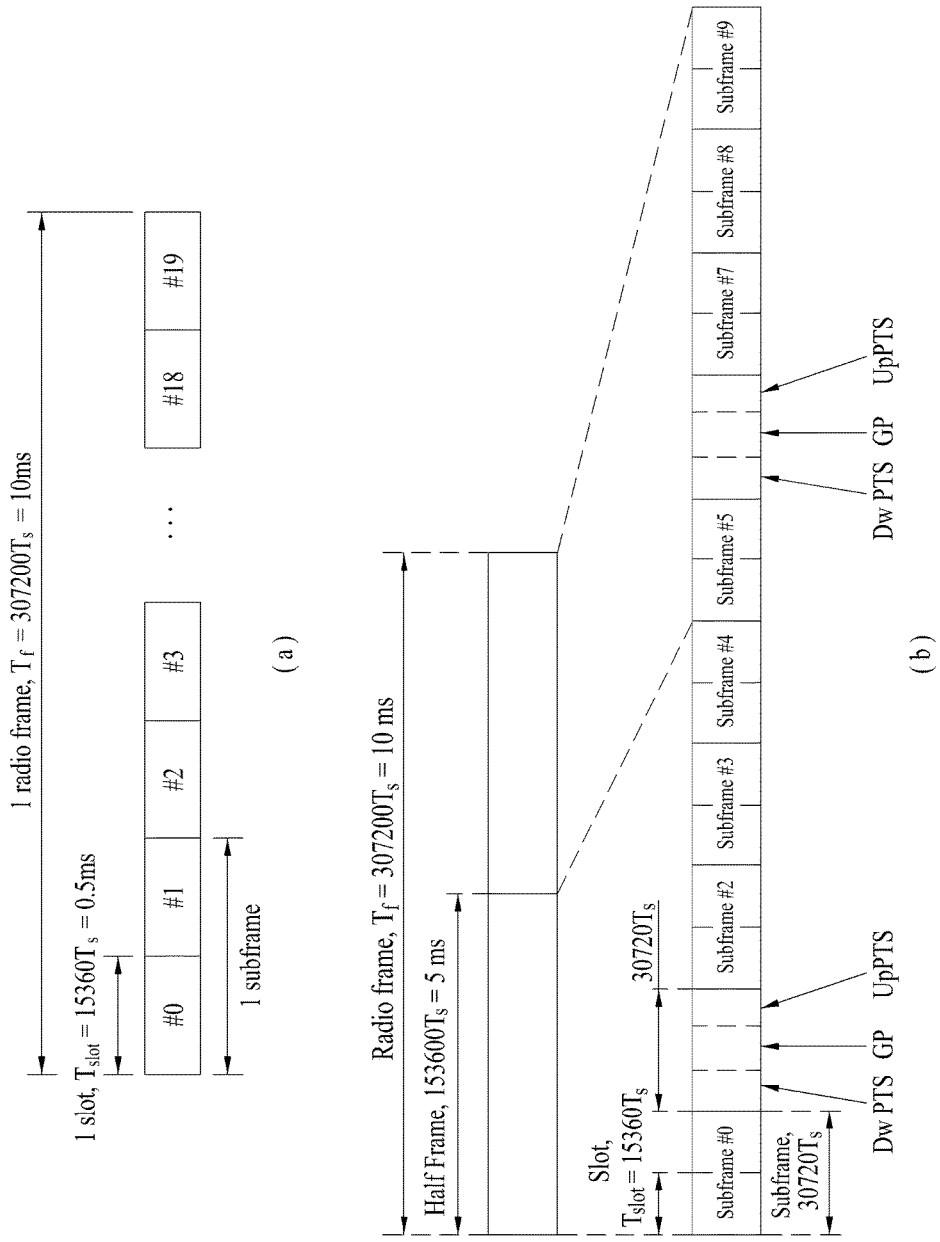
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi). IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio link. At least one antenna is installed per node. The antenna may mean a physical antenna, an antenna port, a virtual antenna, or an antenna group. A node may be referred to as a point. In a multi-node system, the same cell identity (ID) or different cell IDs may be used for signal transmission/reception to/from a plurality of nodes. If a plurality of nodes has the same cell ID, each of the nodes operates as an antenna group of one cell. If nodes in the multi-node system have different cell IDs in the multi-node system, the multi-node system may be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a DL signal is discriminated from a node transmitting a UL signal is called multi-eNB MIMO or coordinated multi-point Tx/Rx (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DSP). When JP is performed, a wider variety of communication environments can be formed, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. In JP, DPS refers to a communication scheme by which a signal is transmitted/received through a node selected from plural nodes according to a specific rule. In the case of DPS, signal transmission reliability can be improved because a node having a good channel state between the node and the UE is selected as a communication node.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink (DL)/uplink (UL) signal of a specific cell refers to a downlink/uplink signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. An interfering cell refers to a cell interfering with a specific cell. Namely, if a signal of a neighboring cell interferes with a signal of a specific cell, the neighboring cell becomes an interfering cell with respect to the specific cell and the specific cell becomes a victim cell with respect to the neighboring cell. If neighboring cells interfere with each other or unilaterally, such interference is referred to as inter-cell interference (ICI). The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. Meanwhile, a 3GPP LTE/LTE-A system uses the concept of a cell in order to manage radio resources and a Cell associated with the radio resources is distinguished from a cell of a geographic region.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both an eNB and a UE. For example, a cell-specific RS (CRS), a UE-specific RS, a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/ PHICH/PDSCH/PUCCH/PUSCH/PRACH is referred to as PDCCH/PCFICH/PHICH/PDSCH/PUCCH/PUSCH/ PRACH RE or PDCCH/PCFICH/PHICH/PDSCH/PUCCH/ PUSCH/PRACH time-frequency resource, respectively. Therefore, in the present invention, PUCCH/PUSCH/ PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

FIG. 1 illustrates the structure of a radio frame used in a wireless communication system.

Specifically. FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307, 200$T_s$) in duration. The radio frame is divided into 10 subframes of equal size. Subframe numbers may be assigned to the 10 subframes within one radio frame, respectively. Here. $T_s$ denotes sampling time where $T_s=1/(2048*15$ kHz). Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
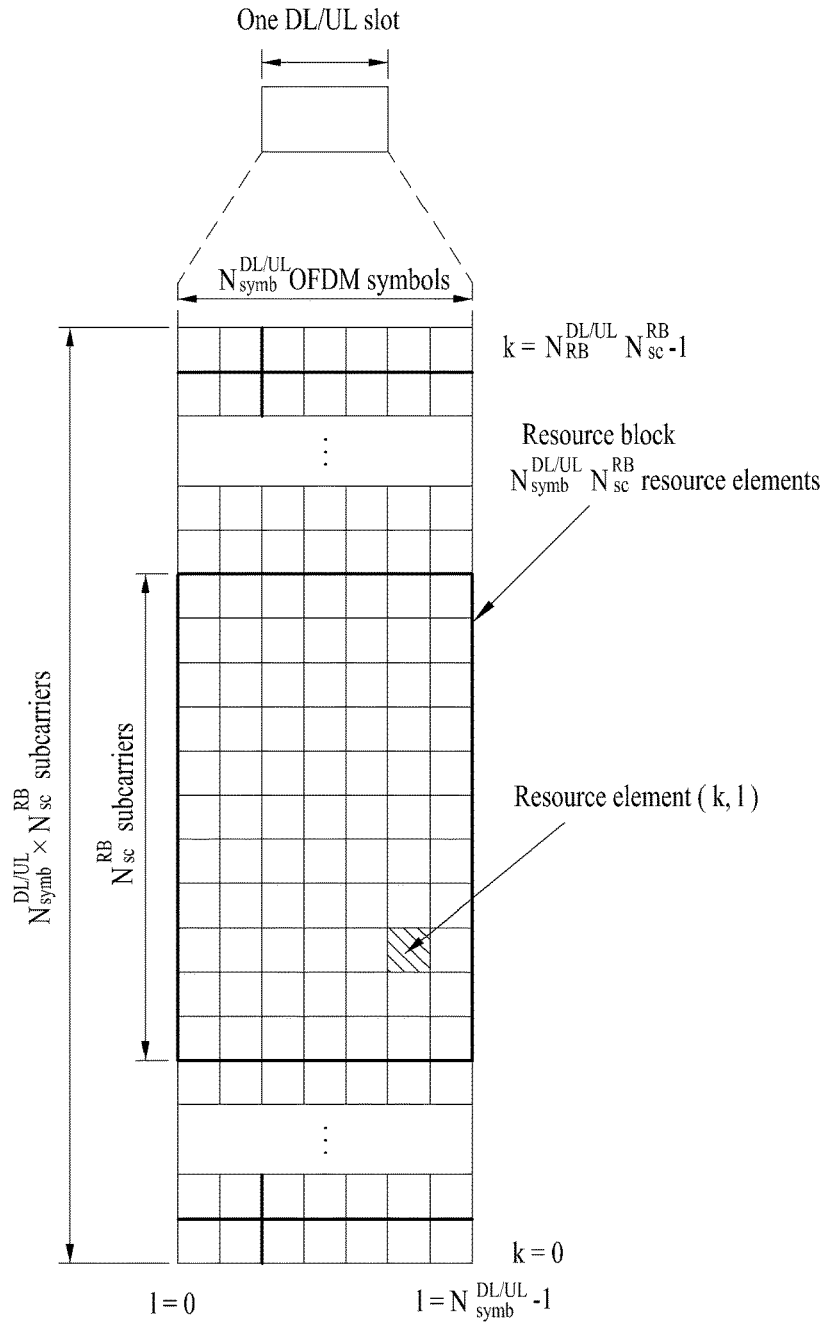
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ a denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
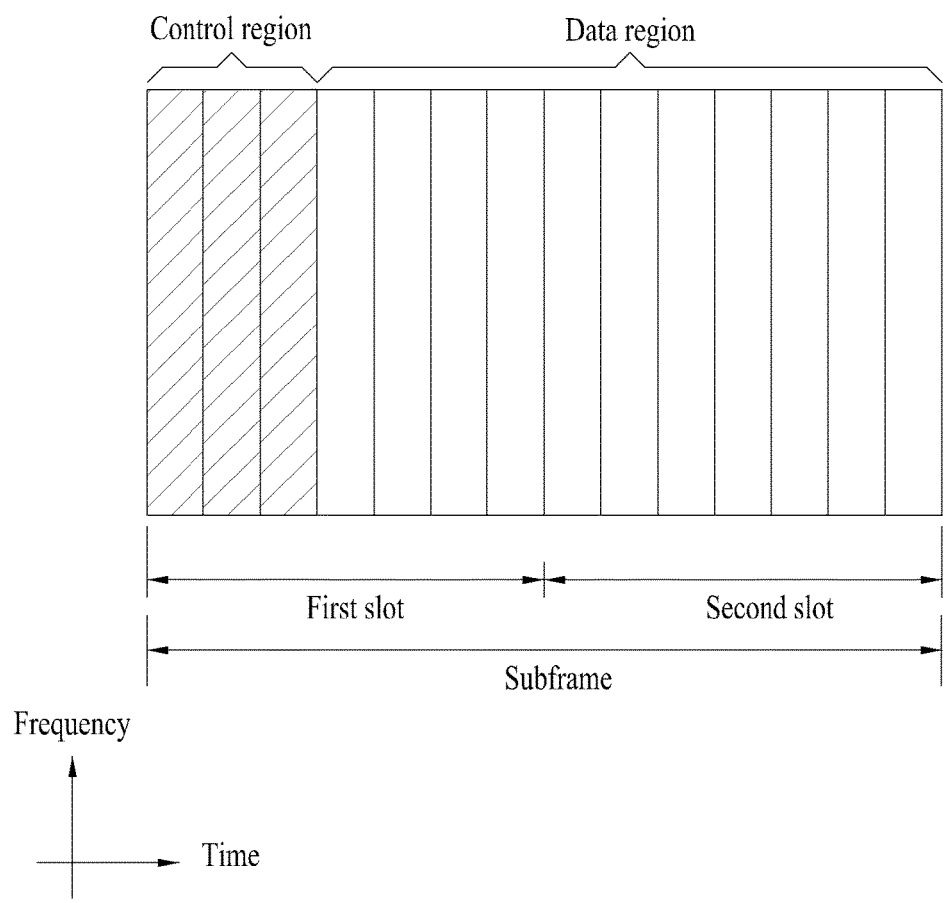
FIG. 3 illustrates a radio frame structure for transmission of a synchronization signal (SS).

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. A transmit format and resource allocation information of a downlink shared channel (DL-SCH) are called DL scheduling information or DL grant. A transmit format and resource allocation information of an uplink shared channel (UL-SCH) are called UL scheduling information or UL grant. The size and usage of the DCI carried by one PDCCH are varied depending on DCI formats. The size of the DCI may be varied depending on a coding rate.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on an aggregation of one or a plurality of continuous control channel elements (CCEs). The CCE is a logical allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channels (that is. PCFICH and PHICH). The number of DCI formats and DCI bits is determined in accordance with the number of CCEs. CCEs are numbered and used consecutively. In order to simplify a decoding process, the PDCCH having a format that includes n CCEs may only start on a CCE having a CCE number corresponding to a multiple of n. The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs may have different sizes and a dedicated SS and a common SS are defined. The dedicated SS is a UE-specific SS and is configured for each individual UE. The common SS is configured for a plurality of UEs. All UEs receive information about the common SS. An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

In the meantime, in order to maintain operation load based on blind decoding at a certain level or less, not all the DCI formats are searched at the same time. For example, the UE is configured semi-statically by upper layer signaling to receive PDSCH data signaled through the PDCCH in accordance with one of transmission modes 1 to 9. Table 3 illustrates a transmission mode for configuring multi-antenna technology and a DCI format where the UE performs blind decoding in accordance with the corresponding transmission mode.

TABLE 3

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is |

TABLE 3-continued

| Transmission mode | DCI format | Search Space | Transmission scheme of PDSCH corresponding to PDCCH |
|---|---|---|---|
| | | | used, otherwise Transmit diversity. MBSFN subframe: Single-antenna port, port 7 |
| | DCI format 2C | UE specific by C-RNTI | Up to 8 layer transmission, ports 7-14 |

In particular, Table 3 illustrates a relation between PDSCH and PDCCH configured by C-RNTI. The UE configured to decode the PDCCH with CRC scrambled in C-RNTI by an upper layer decodes the PDCCH and also decodes the corresponding PDSCH in accordance with each combination defined in Table 3. For example, if the UE is configured in a transmission mode 1 by upper layer signaling, the UE acquires DCI by respectively decoding the PDCCH through the DCI format 1A and 1.

Figure 4:
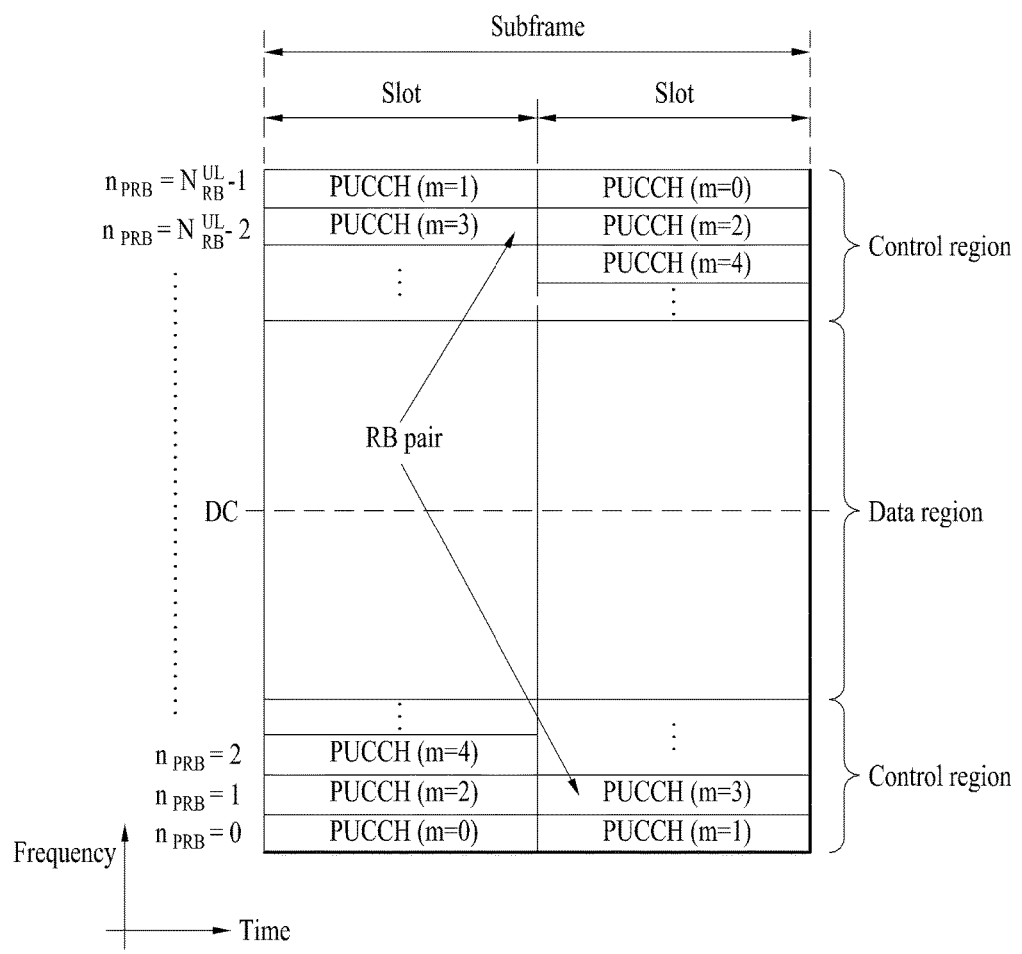
FIG. 4 illustrates the structure of a DL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

In a current 3GPP LTE/LTE-A system, there are two MIMO transmission schemes: open-loop MIMO operated without feedback of channel information and closed-loop MIMO using feedback of channel information. In the case of closed-loop MIMO, each of a transmitting end and a receiving end performs beamforming based on channel information, i.e. CSI, in order to obtain multiplexing gain of MIMO antennas. To acquire CSI, an eNB commands a UE to feed back DL CSI by allocating a PUCCH or a PUSCH to the UE. CSI is broadly categorized into an RI, a PMI, and a channel quality indicator (CQI). RI is information on channel rank, indicating the number of streams or layers that the UE is capable of receiving on the same time-frequency resource. Since RI is dominantly determined by long-term fading of a channel, RI is generally fed back from the UE to the eNB at a cycle longer than that of PMI or CQI. PMI is a value reflecting a spatial characteristic of a channel, indicating an index of a precoding matrix preferred by the UE for DL signal transmission based on a metric of signal-to-interference plus noise ratio (SINR), etc. CQI is a value indicating the strength of a channel and generally indicates a received SINR that can be obtained by the UE when the eNB uses PMI.

Meanwhile, in a 3GPP LTE-A system, an additional diversity scheme using multi-user MIMO (MU-MIMO) has been introduced. In order to acquire diversity gain using MU-MIMO, channel information feedback having higher accuracy is needed. This is because, due to presence of an interference channel between UEs in the antenna domain in MU-MIMO, accuracy of feedback information may significantly affect interference not only with a UE reporting the feedback information but also with other UEs receiving a signal multiplexed on the same time-frequency as a time-frequency of a signal for the UE. Accordingly, the 3GPP LTE-A system defines W1, which is a long-term and/or wideband PMT, and W2, which is a short-term and/or subband PMI, in order to raise accuracy of the feedback information. A final PMI may be configured from W1 and W2.

Even in the case of CoMP, higher accuracy for channel information is needed. For example, in the case of CoMP JT, since multiple nodes coordinate transmission of the same data to a specific UE, channel information having accuracy of a high level is theoretically needed to avoid interference between co-scheduled UEs as in a single-cell MU-MIMO. Similarly, in the case of CoMP CB, accurate channel information is needed to avoid interference of a neighboring cell with a serving cell.

CQI will now be described in more detail. Based on an unrestricted observation interval in time and frequency, the UE derives, for each CQI value reported in UL subframe n, the highest CQI index from among predefined CQI indexes satisfying a specific condition or derives CQI index 0 if CQI index 1 does not satisfy the specific condition. CQI indexes may be predefined as follows.

TABLE 4

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A condition that a single PDSCH transport block with a combination of modulation scheme and transport block size corresponding to the CQI index, and occupying a group of DL physical resource blocks termed a CSI reference resource, can be received with a transport block error probability not exceeding 0.1 may be used as the specific condition. Here, the CSI reference resource refers to a resource referred to for measurement of CSI when a UE measures and reports the CSI. The CSI reference resource will be described later in detail. The combination of modulation scheme and transport block size corresponds to the CQI index if the combination can be signaled for transmission on a PDSCH in a CQI reference resource according to a relevant transport block size table, the modulation scheme is indicated by the CQI index, and the combination when applied to the CSI reference resource results in the code rate which is the closest possible to a code rate indicated by the CQI index. If more than one combination of modulation scheme and transport block size results in a code rate equally close to the code rate indicated by the CQI index, only the combination with the smallest of such transport block sizes is relevant.

Time-domain inter-cell interference coordination is considered as an interference coordination method for avoiding interference between neighboring cells. In time-domain inter-cell interference coordination, an interfering cell uses a silent subframe in which transmit power or activity of some physical channels is reduced and a victim cell transmits/receives a signal to/from a UE in the silent subframe. The interfering cell may transmit/receive a physical channel set to zero power to/from the UE in the silent subframe. The silent subframe is called an almost blank subframe (ABS). When the silent subframe is used, an interference level greatly varies with subframes from the perspective of a UE located in the victim cell. Accordingly, in order to more accurately perform radio link monitoring (RLM), to perform radio resource management (RRM) for measuring reference signal received power (RSRP), received signal received quality (RSRQ), received signal strength indicator (RSSI), etc., or to estimate or measure CSI for link adaptation in each subframe in a time-domain inter-cell interference coordination situation, subframes performed by the UE for the monitoring or measurement operation should be restricted to a set of subframes having uniform or similar interference characteristics. To this end, subframes may be divided into a plurality of subframe sets based on interference characteristics and information about the subframes may be provided to the UE. For example, if higher layer signaling indicates subframes for restricted RRM, the UE performs assessment of radio link quality in the indicated subframes and does not perform assessment in subframes other than the indicated subframes. If CSI subframe sets $C_{CSI,0}$ and $C_{CSI,1}$ are configured by higher layers, each CSI reference resource belongs to either $C_{CSI,0}$ or $C_{CSI,1}$ but not to both. When $C_{CSI,0}$ and $C_{CSI,1}$ are configured by higher layers, the UE is not expected to receive a trigger for which the CSI reference resource is in a subframe that does not belong either $C_{CSI,0}$ or $C_{CSI,1}$.

Figure 5:
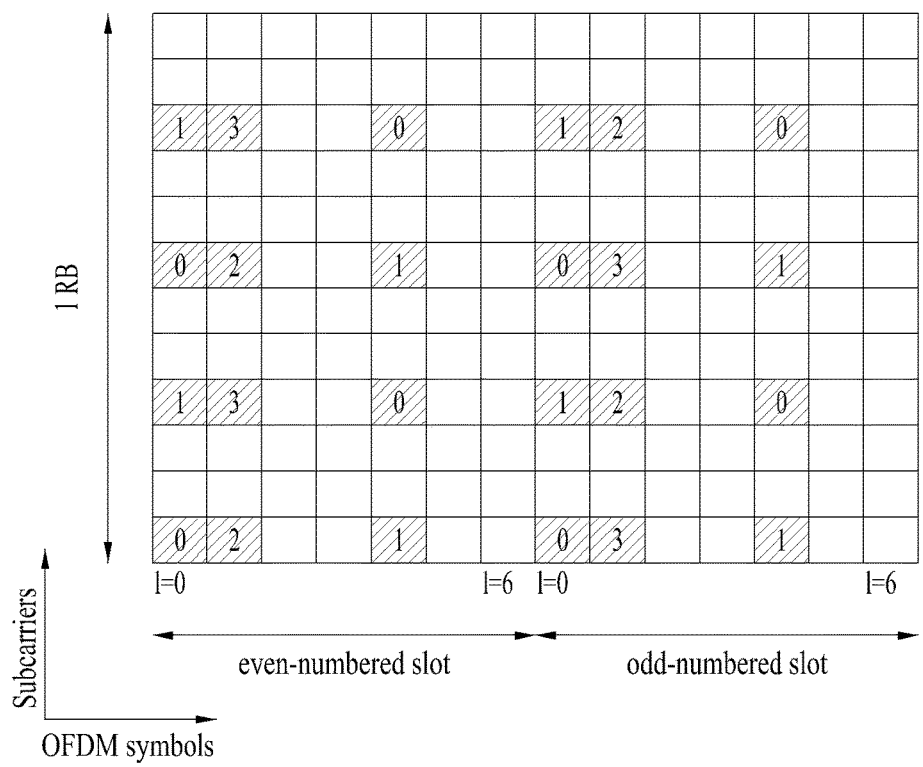
FIG. 5 illustrates configuration of cell specific reference signals (CRSs).
Figure 5:

For RLM, RRM, and CSI measurements by the UE, CSI-RSs and CRSs may be used. FIG. 5 illustrates CRSs. RSs may be broadly divided into RSs for modulation and RSs for channel measurement. In a 3GPP LTE/LTE-A system, a CRS is an RS that can be used for both demodulation and measurement and is shared by all UEs in a cell. Since the CRS is used for both demodulation and measurement, a CRS sequence is transmitted over all antenna ports configured for an eNB irrespective of the number of layers and is transmitted in all subframes supporting DL transmission. The UE may measure CSI using the CRS and demodulate a signal received through a PDSCH in a subframe including the CRS. In transmission modes 1 to 8 defined in the 3GPP LTE system, the CRS is used for DL channel measurement and DL signal demodulation.

Figure 6:
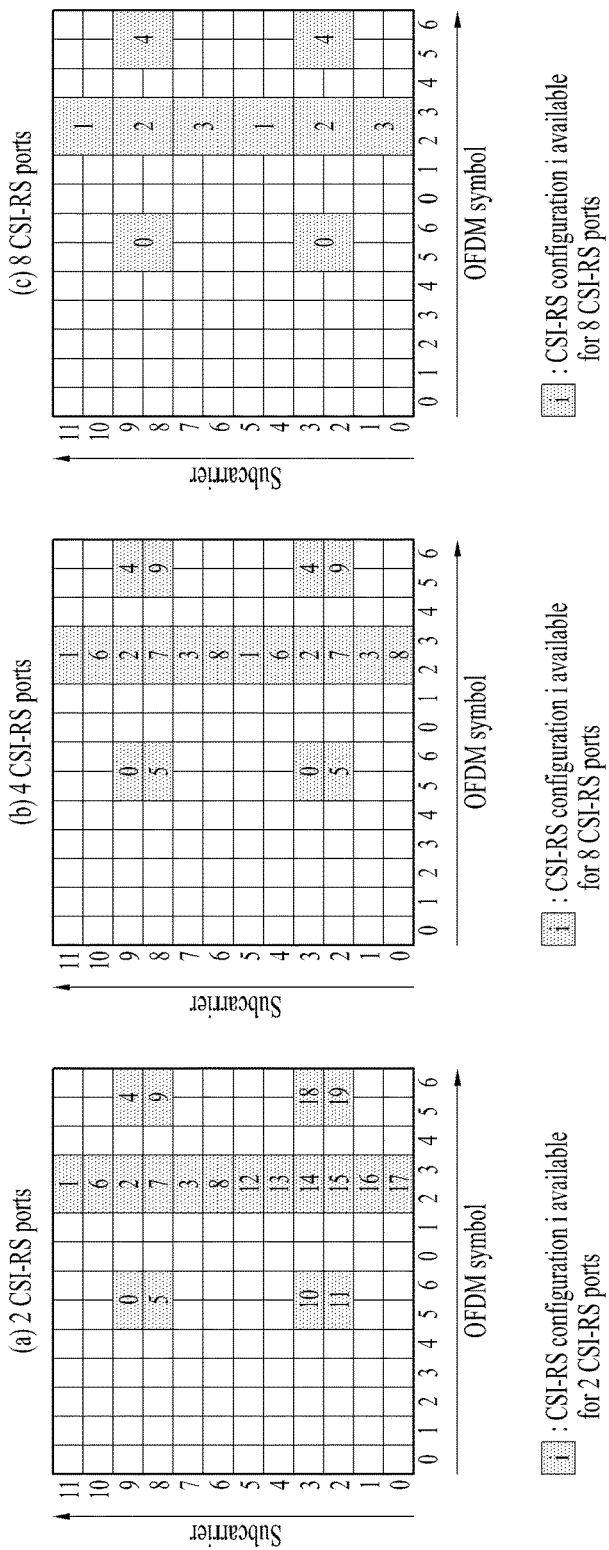
FIG. 6 illustrates channel state information reference signal (CSI-RS) configurations

Separately from the CRS, a CSI-RS and a UE-specific RS have been introduced as DL RSs in the 3GPP LTE-A system. FIG. 6 illustrates CSI-RS configurations. Particularly, FIG. 6(a) illustrates 20 CSI-RS configurations 0 to 19 available for CSI-RS transmission over two CSI-RS ports among the CSI-RS configuration. FIG. 6(b) illustrates 10 CSI-RS configurations 0 to 10 available over four CSI-RS ports among the CSI-RS configurations FIG. 6(c) illustrates 5 CSI-RS configurations 0 to 4 available over 8 CSI-RS ports among the CSI-RS configurations.

Unlike the CRS configured to be transmitted in every subframe, the CSI-RS is configured to be transmitted at a predetermined transmission period corresponding to plural subframes. The UE-specific RS is configured to be transmitted only in subframes and/or RBs in which a PDSCH is configured, as opposed to the CRS configured to be transmitted in every subframe regardless of the presence of the PDSCH. A UE may measure a channel state using the CSI-RS and demodulates the PDSCH using the UE-specific RS. In the 3GPP LTE-A system, transmission mode 9 is defined in which the UE is capable of receiving up to 8 layers using the UE-specific RS. Since the UE-specific RS is transmitted in each layer, the UE may demodulate layer(s) therefor using the UE-specific RS(s). If the UE is configured with transmission mode 9 for PMI/RI reporting, the UE derives channel measurements for computing a CQI value reported in UL subframe n based on the CSI-RS. For transmission mode 9 when PMI/RI reporting is disabled or for any one of transmission modes 1 to 8, the UE performs channel measurements for computing a CQI based on the CRS.

Meanwhile, the CSI reference resource may be defined in the frequency domain and the time domain. In the frequency domain, the CSI reference resource may be defined by a group of DL physical resource blocks corresponding to a band with which the derived CQI value is associated.

In the time domain, the CSI reference resource for CSI reporting transmitted in UL subframe n may be defined by a single DL subframe $n-n_{CQI\_ref}$ depending upon whether the CSI reporting is periodic or aperiodic. For example, for periodic CSI reporting, DL subframe $n_{CQI\_ref}$ is the smallest value greater than or equal to 4, such that DL subframe $n_{CQI\_ref}$ corresponds to a valid DL subframe; for aperiodic CSI reporting, $n_{CQI\_ref}$ is a value such that the CSI reference resource is in the same valid DL subframe as a DL subframe including a CSI request in a UL DCI format; and for aperiodic CSI reporting related to random access, $n_{CQI\_ref}$ is equal to 4 and DL subframe $n-n_{CQI\_ref}$ corresponds to a valid DL subframe, where DL subframe $n-n_{CQI\_ref}$ is received after a subframe with a corresponding CSI request in a random access response grant. That is, the CSI reference resource for CSI reporting transmitted in UL subframe n is defined as a DL subframe associated with the UL subframe according to a predetermined rule.

Meanwhile, if a DL subframe:
is configured as a DL subframe for that UE, and
is not a multimedia broadcast multicast service single frequency network (MBSFN) subframe, and
does not contain a DwPTS field in the case in which the length of DwPTS is 7680·Ts or less, and
does not fall within a configured measurement gap for that UE, and
for periodic CSI reporting, is an element of a CSI subframe set linked to the periodic CSI report when that UE is configured with CSI subframe sets,
then, the DL subframe is considered to be valid for the CSI reference resource.

If there is no valid DL subframe for the CSI reference resource, CSI reporting is omitted in UL subframe n.

In the layer domain, the CSI reference resource is defined by any RI and PMI on which CQI is conditioned.

The UE assumes the following for the purpose of deriving a CQI index and deriving RI and PMI if RI and PMI reporting is configured. For example, the UE may derive CSI by assuming that: the first three OFDM symbols in the CSI reference resource are occupied by control signaling; no resource elements are used by synchronization signals or a PBCH in the CSI reference resource; for CSI reporting for transmission mode 9, if the UE is configured for PMI/RI reporting, UE-specific RS overhead in the CSI reference resource is consistent with the most recently reported rank; and a PDSCH transmission scheme depends on a transmission mode currently configured for the UE. According to transmission mode the PDSCH transmission scheme may be assumed for the CSI reference resource as follows.

TABLE 5

| Transmission mode | Transmission scheme of PDSCH |
|---|---|
| 1 | Single-antenna port, port 0. |
| 2 | Transmit diversity. |
| 3 | Transmit diversity if the associated with rank indicator is 1, otherwise large delay CDD (Cyclic Delay Diversity). |
| 4 | Closed-loop spatial multiplexing. |
| 5 | Multi-user MIMO. |
| 6 | Closed-loop spatial multiplexing with a single transmission layer. |
| 7 | If the number of PBCH antenna ports is one, single antenna port, port 0; otherwise transmit diversity. |
| 8 | If the UE is configured without PMI/RI reporting: if the number of PBCH antenna ports is one, single-antenna port, port 0; otherwise transmit diversity. If the UE is configured with PMI/RI reporting: closed-loop spatial multiplexing. |
| 9 | If the UE is configured without PMI/RI reporting: if the number of PBCH antenna ports is one, single-antenna port, port 0; otherwise transmit diversity. If the UE is configured with PMI/RI reporting: if the number of CSI-RS ports is one, single antenna port, port 7; otherwise up to 8 layer transmission, ports 7-14. |

In Table 5, antenna port 0 is one of antenna ports 0 to 4 configured for CRS transmission and antenna ports 7 to 14 correspond to antenna ports configured for UE-specific RS transmission.

Since a DL channel state is greatly affected by interference in a corresponding cell, not only a result of channel measurement for recognizing the channel state by measuring received strength of an RS for DL channel measurement but also a result of interference measurement for measuring interference affected by other DL signals on a corresponding channel needs to be factored in when computing CSI. In the 3GPP LTE/LTE-A system up to now, an interference measurement resource has not been explicitly provided to a UE and which resources the UE uses for interference measurement has not been defined. When the UE measures interference on arbitrary resources other than resources occupied by a CRS or CSI-RS of a serving cell, since the UE cannot know how the arbitrary resources are used in a neighboring cell, interference measurement using a signal received in the arbitrary resources has increased the risk of an incorrect result. Accordingly, interference measurement has typically been performed in such a manner that a legacy UE assumes a remaining signal after eliminating a CRS of a serving cell as interference.

As in the above description of CoMP or inter-cell interference coordination (ICIC), neighboring cells may perform an operation of lowering transmit power in order to mitigate inter-cell interference and then an inter-cell interference level observed from one UE differently appears on each time or frequency resource. In this situation, if the UE averages interference measurement values of all resources, interference measurement suitable for a specific resource is not performed and thus an effect of a CoMP or ICIC operation may be reduced. To solve such a problem, an eNB may explicitly indicate a resource on which interference is to be measured (hereinafter, an interference measurement resource) through a higher layer signal such as a radio resource control (RRC) signal when the UE computes CSI. As an example, the eNB may inform the UE of a resource (e.g. some REs) on which a neighboring cell does not always perform transmission as the interference measurement resource so that CSI calculated and reported by the UE based on the resource may be regarded as a channel state when the neighboring cell does not perform transmission and may be used for scheduling. When necessary, the eNB may inform the UE of a plurality of interference measurement resources to command the UE to calculate and report CSI for each resource. It is desirable that an eNB to which a UE is connected or an eNB which manages a node of a cell in which the UE is located (hereinafter, a serving eNB) transmit no signals on an interference measurement resource. Therefore, the interference measurement resource may be configured for the UE in the form of a zero-power CSI-RS. As described with reference to FIG. 6, the 3GPP LTE-A system defines plural CSI-RS configurations for CSI-RS transmission. A time-frequency resource for which the UE assumes zero transmission power is configured using 16 CSI-RS configurations for four CSI-RS ports. Upon receiving bitmap information composed of 16 bits corresponding one to one to the 16 CSI-RS configurations, the UE assumes zero transmission power for REs corresponding to CSI-RS configuration(s) corresponding to bit(s) set to 1 among the 16 bits. The eNB may inform the UE of REs used by the UE for interference measurement in the same manner as a scheme of signaling the zero-power CSI-RS.

The interference measurement resource explicitly configured for a UE through higher layer signaling is valid only for a UE configured to be able to interpret signaling for the interference measurement resource. In other words, a UE implemented according to a communication system prior to introduction of higher layer signaling for explicitly configuring the interference measurement resource (hereinafter, a legacy UE) cannot identify the interference measurement resource. Accordingly, in the case in which an interference measurement resource which cannot be identified by the legacy UE is present in all subframes, performance of the legacy UE may significantly deteriorate. Hence, it is desirable that an interference measurement resource explicitly configured for the UE appear once per every few subframes with a predetermined period.

Likewise, if the interference measurement resource is explicitly configured for the UE, the UE measures interference on the interference measurement resource and computes CSI under the assumption that this interference is interference on a CSI reference resource referred to for CSI measurement. In more detail, the UE may perform channel measurement based on a CSI-RS or a CRS and perform interference measurement based on the interference measurement resource, thereby deriving CSI based on the channel measurement and the interference measurement. However, since the interference measurement resource is not configured in every subframe as described earlier, a subframe corresponding to the CSI reference resource and a subframe in which the interference measurement resource is configured may not be equal.

Figure 7:
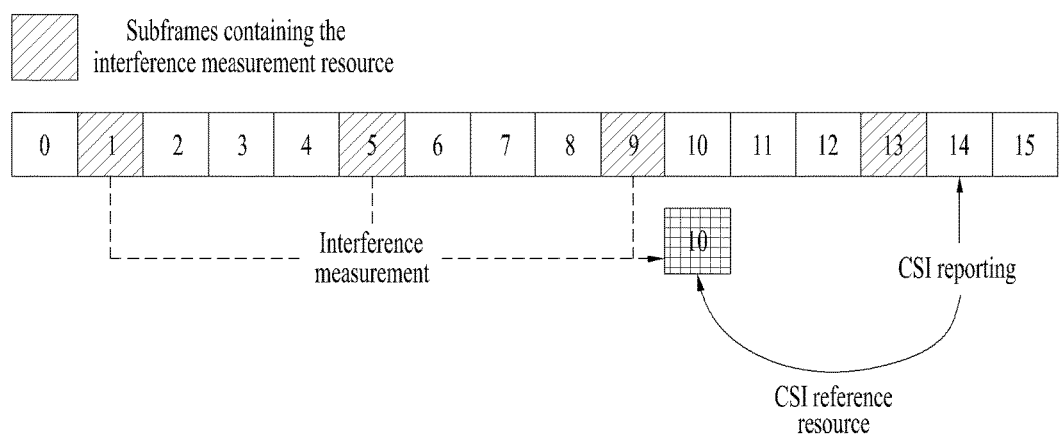
FIG. 7 illustrates the structure of a UL subframe used in a wireless communication system.

FIG. 7 is a diagram for explaining embodiments of the present invention.

Referring to FIG. 7, an interference measurement resource is transmitted or configured (hereinafter, transmitted/configured) at a period of 4 ms based on subframe 1 and a UE calculates CSI by regarding subframe 10 as a CSI reference resource and reports the CSI in subframe 14. In this case, although subframe 10, which is the CSI reference resource, corresponds to a subframe in which the interference measurement resource is not transmitted/configured, the UE may calculate the CSI based on interference measurement in another subframe in which the interference measurement resource is transmitted/configured.

As described above, if the interference measurement resource is explicitly indicated, the CSI reference resource is irrelevant to the interference measurement resource and even though any subframe is designated as the CSI reference resource, operation of the UE is not affected in terms of interference measurement. Accordingly, the present invention proposes considering whether the interference measurement resource is signaled to the UE in determining whether a subframe corresponding to the CSI reference resource is a valid DL subframe. For example, whether or not an MBSFN subframe is valid for the CSI reference resource may be determined according to whether the interference measurement resource is explicitly configured for the UE.

In conventional CRS based transmission modes, if a CSI reference resource corresponds to an MBSFN subframe, the MBSFN subframe has been considered a DL subframe which is not valid, that is, an invalid DL subframe. The MBSFN subframe is divided into a non-MBSFN region and an MBSFN region in the time domain. The non-MBSFN region spans the first one or two OFDM symbols in the MBSFN subframe and the MBSFN region is defined as OFDM symbols unused for the non-MBSFN region. In the MBSFN subframe, a CRS is transmitted only in the non-MBSFN region. Referring to FIG. 5, since the non-MBSFN region of the MBSFN subframe spans the first one or two OFDM symbols, the CRS is not transmitted on OFDM symbols other than the first two OFDM symbols. Since the first three OFDM symbols of a DL subframe are used for DL control information and the other OFDM symbols are used for DL data transmission, the MBSFN region of the MBSFN subframe is called a PDSCH region of the MBSFN subframe. However, in transmission modes 1 to 8, a PDSCH is not transmitted in the MBSFN region of the MBSFN subframe. Nonetheless, in 3GPP LTE-A, it has been considered to use the MBSFN region of the MBSFN subframe for PDSCH transmission. When the PDSCH is transmitted in the MBSFN subframe, the PDSCH is transmitted over antenna port(s) $p \in \{7, 8, \ldots, v+6\}$ (where v is the number of layers used for transmission of the PDSCH) configured for UE-specific RS(s). Since the CRS is not transmitted in the MBSFN region of the MBSFN subframe, the number of REs occupied by the CRS (hereinafter, CRS REs) is insufficient to perform CRS based interference measurement, thereby making it difficult to accurately measure interference. Hence, the MBSFN subframe is not a valid DL subframe for the CSI reference resource.

However, if an eNB explicitly indicates an additional interference measurement resource to a UE, since the UE does not measure interference using a CRS, the UE may report CSI derived based on an MBSFN subframe even though the MBSFN subframe corresponds to a CSI reference resource. Accordingly, the present invention proposes that a UE regard an MBSFN as a valid DL subframe when an interference measurement resource is (explicitly) configured for the UE. That is, the present invention proposes that a UE regard an MBSFN subframe as a valid DL subframe for a CSI reference resource and perform CSI related calculation and reporting operation, when the UE is configured to explicitly receive an interference measurement resource. For aperiodic CSI reporting, since a subframe in which aperiodic CSI reporting is triggered corresponds to a CSI reference resource in the time domain, the present invention is especially effective in aperiodic CSI reporting. According to a conventional operation, upon receiving a request for aperiodic CSI reporting in an MBSFN subframe, the UE considers the MBSFN subframe to be invalid for a CSI reference resource and drops CSI reporting. According to the present invention, however, when an interference measurement resource is explicitly transmitted to the UE, the UE transmits aperiodic CSI reporting triggered in the MBSFN subframe without drop because the MBSFN subframe is also a valid DL subframe for the CSI reference resource. Furthermore, the present invention is effective even in the case of periodic CSI reporting. For periodic CSI reporting, a CSI reference resource for CSI to be reported in UL subframe n is defined as a valid DL subframe which is nearest UL subframe n among subframe n−4 or DL subframes preceding subframe n−4. If subframe n−4 is an MBSFN subframe, the legacy UE searches for a DL subframe satisfying the following conditions that: it is not an MBSFN subframe among preceding DL subframes: it is a DL subframe configured for the UE; a DwPTS is not 7680 $T_s$ or less; it does not fall within a measurement gap configured for the UE; and it belongs to a subframe set linked to the periodic CSI report. The legacy UE uses the DL subframe as the CSI reference resource. In this case, there is a probability of dropping CSI reporting because a valid DL subframe is not present between UL subframe n and a periodic CSI reporting timing prior to UL subframe n. In addition, if a DL subframe distant from subframe n−4, which is an original CSI reference resource, is used as a new CSI reference resource, accuracy of CSI reporting is deteriorated. According to the present invention, when an interference measurement resource is explicitly configured for the UE, if CSI is reported by regarding an MBSFN subframe as a valid CSI reference resource, communication quality/throughput in a multi-cell environment can be improved.

According to the present invention, determination conditions as to whether a DL subframe is valid for a CSI reference resource may be modified. For example, if a DL subframe:

is configured as a DL subframe for that UE, and
is not an MBSFN subframe (except for the case in which an interference measurement resource is (explicitly) configured for that UE), and
does not contain a DwPTS field in the case in which the length of DwPTS is 7680·Ts or less, and
does not fall within a measurement gap configured for that UE, and
for periodic CSI reporting, is an element of a subframe set linked to the periodic CSI report when that UE is configured with CSI subframe sets.

then, the DL subframe may be considered to be valid for the CSI reference resource. If there is no valid DL subframe for the CSI reference resource, CSI reporting in UL subframe n is omitted.

Figure 8:
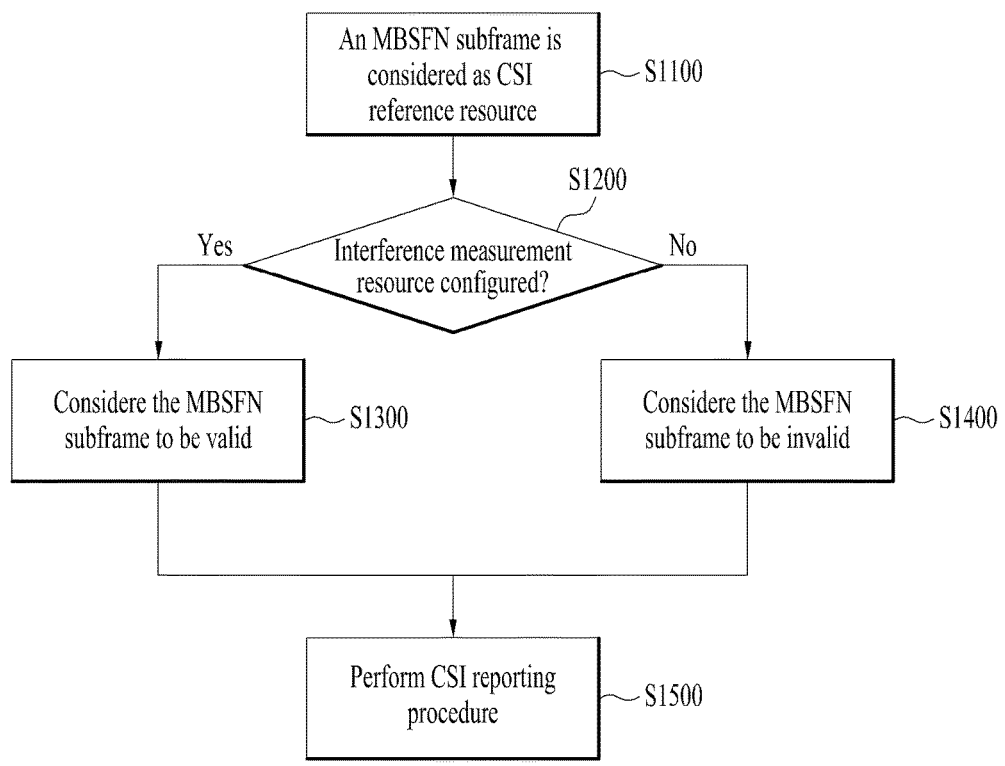
FIG. 8 illustrates a method for determining validity of a CSI-RS according to an embodiment of the present invention.

FIG. 8 illustrates a method for determining validity of a CSI reference resource according to an embodiment of the present invention.

If an MBSFN subframe is considered a CSI reference resource, that is, if the CSI reference resource corresponds to the MBSFN subframe (S1100), it is determined whether the MBSFN subframe is valid for the CSI reference resource according to whether an interference measurement resource is explicitly configured for a UE (S1200).

If the interference measurement resource is (explicitly) configured for the UE, that is, if the UE is configured with a transmission mode in which the interference measurement resource is (explicitly) configured (S1200, YES), the UE considers the MBSFN subframe to be a valid DL subframe (S1300) and performs a CSI reporting procedure (S1500). For example, the UE calculates, derives, or measures (hereinafter, calculates/derives/measures) CSI based on the MBSFN subframe and transmits the CSI to an eNB.

Meanwhile, if the interference measurement resource is not (explicitly) configured for the UE, that is, if the UE is not configured with a transmission mode in which the interference measurement resource is (explicitly) configured (S1200, NO), the UE considers the MBSFN subframe to be invalid for the CSI reference resource (S1400) and performs the CSI reporting procedure (S1500). For example, in the case of periodic CSI reporting, the UE considers the MBSFN subframe to be invalid and performs CSI reporting by regarding a valid DL subframe which is nearest the MBSFN subframe among preceding DL subframes as the CSI reference resource. In the case of aperiodic CSI reporting, if a DL subframe in which the UE receives CSI reporting is the MBSFN subframe, the UE drops (i.e. does not transmit) aperiodic CSI reporting.

Since the period and location of the MBSFN subframe are configured by a higher layer and is signaled to the UE, the eNB may be aware of which subframe among subframes configured for the UE is the MBSFN subframe. In addition, since the transmission mode of the UE is signaled to the UE by the higher layer, the eNB may be aware of which transmission mode is configured for the UE. If an interference measurement resource is explicitly configured for the UE, the eNB may be aware of whether the interference measurement resource is explicitly configured for the UE and which subframe includes the interference measurement resource, because the interference measurement resource will be reported to the UE through at least one of nodes which have participated in configuration of the interference measurement resource or which are managed by the eNB. That is, the eNB may be aware of for which CSI reference resource CSI is received from the UE in UL subframe n, that is, for which frequency resource of a DL subframe CSI is received. For example, when the interference measurement resource is (explicitly) configured for the UE, the eNB may determine, like the UE, that CSI reporting from the UE has been calculated based on the MBSFN subframe by considering the MBSFN subframe to be a valid DL subframe for the CSI reference resource. In other words, the determination method of FIG. 8 may be identically applied to the eNB and the UE.

Meanwhile, the eNB may configure the UE to calculate and report plural CSI. Some CSI may be calculated based on a measurement value from the explicitly configured interference measurement resource and the other CSI may be calculated without an additional explicit indication for the interference measurement resource. In this case, the above-described embodiment may be restricted such that the present invention may be applied only when CSI for which the CSI reference resource is configured is derived from the explicitly configured interference measurement resource. For example, even though the interference measurement resource is explicitly configured for the UE, the UE may consider the MBSFN subframe to be an invalid DL subframe if CSI reported at a specific timing is not derived based on the interference measurement resource explicitly configured for the UE.

As a modified embodiment of the present invention, it is proposed that the MBSFN subframe be considered to be valid for the CSI reference resource in a situation in which CSI is reported by performing channel measurement based not on a CRS but on a CSI-RS even when the UE is configured with a transmission mode for performing data demodulation based on the CRS. In other words, even when the UE is configured to operate in a CRS based transmission mode, if the UE is configured to report CSI by performing CSI-RS based channel measurement, the UE may report the CSI by considering the MBSFN subframe to be valid for the reference resource. Generally, in the CRS based transmission mode, although both CSI measurement and demodulation are performed using the CRS, the CSI may be calculated using CSI-RS based channel measurement in a specific case with the proviso that demodulation of a PDSCH is performed using the CRS. For example. CoMP for transmitting the PDSCH through coordination between multiple cells based on the CRS may be designed to report the CSI based on the CSI-RS and, in this case, the CSI is preferably calculated from CSI-RS based channel measurement. On the other hand, even if a CSI-RS based CoMP operation is designed, it is more favorable in a situation in which there are many legacy UEs using the CRS that the CRS transmitted in every subframe be used for demodulation irrespective of the PDSCH in comparison with the case in which a UE-specific RS for each layer of the PDSCH is additionally provided to the UE. If the UE-specific RS is additionally provided, RS overhead occurs in addition to existing CRS overhead in a DL subframe, whereas, if the CRS is used for demodulation, occurrence of additional RS overhead caused by the UE-specific RS can be prevented. Even when the UE is configured with the CRS based transmission mode, the eNB interprets CSI reporting from the UE by considering the MBSFN subframe to be valid for the CSI reference resource when channel measurement for CSI should be measured based on the CSI-RS. For example, referring to FIG. 7, assuming that the transmission mode of the UE is one of CRS based transmission modes and subframe 10 corresponding to the CSI reference resource is the MBSFN subframe, in the case of periodic CSI reporting, the legacy UE searches for a valid DL subframe which is nearest except for the MBSFN subframe among other DL subframes prior to subframe 10 and reports CSI in a corresponding DL subframe. In the case of aperiodic CSI reporting, even though an aperiodic CSI reporting request is received in subframe 10, the UE will omit CSI reporting corresponding thereto. Since the eNB knows that the UE will perform the above operation, the eNB is able to know that periodic CSI reporting received from the UE is related to a valid DL subframe which is nearest subframe 10 among other DL subframes prior to subframe 10. However, according to the present embodiment, even if the transmission mode of the UE is a CRS based transmission mode and subframe 10 corresponding to the CSI reference resource is the MBSFN subframe, the UE may calculate CSI based on subframe 10 and report periodic CSI or aperiodic CSI and the eNB may recognize that CSI received from the UE has been calculated based on subframe 10.

As appreciated from the foregoing description, whether the interference measurement resource is explicitly designated for the UE may affect validity of a DL subframe as the CSI reference resource. According to a modified embodiment, the present invention proposes that only subframes including an explicitly configured interference measurement resource be considered a valid DL subframe for the CSI reference resource. Referring to FIG. 7, the location of the CSI reference resource may be configured regardless of a location at which interference measurement is actually performed. In other words, a subframe including the CSI reference resource may not be consistent with a subframe including the interference measurement resource. However, in order to independently configure the CSI reference resource from the interference measurement resource, the UE needs to store a measurement result on the interference measurement resource and then calculate and report CSI for a location irrelevant to the interference measurement resource. Hence, the UE needs to include an additional memory for storing the interference measurement value. As one method for properly performing operations on the interference measurement resource without the additional memory, only a subframe including the interference measurement resource may be considered a valid CSI reference resource in the case in which the interference measurement resource is explicitly configured. That is, the UE may regard interference measured in a subframe including the interference measurement resource as interference on all REs in the subframe and calculate CSI for the subframe. In addition, the UE may consider a subframe which does not include the interference measurement resource to be invalid for the CSI reference resource. In the case of aperiodic CSI reporting, the eNB may trigger aperiodic CSI reporting only in a subframe including the interference measurement resource. If the eNB triggers CSI reporting only in a subframe including the interference measurement resource, since the UE may calculate CSI by measuring interference on the interference measurement resource in a subframe in which an aperiodic CSI reporting request is received, the additional memory for storing the interference measurement value is not needed. In this case, the determination conditions as to whether a DL subframe is valid for the CSI reference resource may be modified. For example, if a DL subframe:

is configured as a DL subframe for that UE, and
is not an MBSFN subframe, and
does not contain a DwPTS field in the case in which the length of DwPTS is 7680·Ts or less, and
does not fall within a measurement gap configured for that UE, and
for periodic CSI reporting, is an element of a subframe set linked to the periodic CSI report when that UE is configured with CSI subframe sets, and
includes an interference measurement resource when use of the interference measurement resource for CSI is configured by higher layers.

then, the DL subframe may be considered to be valid for the CSI reference resource. If a valid DL subframe for the CSI reference resource is absent, CSI reporting in UL subframe n is omitted.

However, if only a subframe including the interference measurement resource is considered a valid CSI reference resource, for aperiodic CSI reporting, there are limitations in that the eNB should trigger aperiodic CSI reporting only in a subframe including the interference measurement resource. In order to eliminate such restrictions on the eNB, the present embodiment in which only a subframe including the interference measurement resource is interpreted as the valid CSI reference resource may be limitedly applied only to periodic CSI reporting. In this case, for periodic CSI reporting, the UE may perform interference measurement based on an interference measurement resource in a subframe which includes an interference measurement resource and corresponds to a CSI reference resource and may report CSI calculated based on the interference measurement at a preset timing, for example, in a subframe which is associated with the subframe and corresponds to a CSI reporting period. In the case of aperiodic CSI reporting, the UE may consider even a subframe which does not include the interference measurement resource to be valid for the CSI reference resource but may be operated to measure interference using a resource other than the interference measurement resource in the subframe which does not include the interference measurement resource. For example, since a signal received by the UE on a CRS resource of a serving cell is a value obtained by adding a CRS to an interference signal, the UE may measure the amount of an interference signal by cancelling the predetermined amount of CRS signal from the amount of a signal received on the CRS resource. Alternatively, aperiodic CSI triggered in a subframe which does not include the interference measurement resource may be omitted. Alternatively, the embodiment in which only a subframe with the interference measurement resource is considered to be valid for the CSI reference resource may be commonly applied to periodic CSI reporting and aperiodic CSI reporting but the CSI reference resource for aperiodic CSI reporting may be changed in order to relieve restrictions for aperiodic CSI reporting on the eNB. For example, if aperiodic CSI reporting is triggered in a subframe which does not include the interference measurement resource, the subframe is not considered the CSI reference resource and, among subframes prior to the subframe, the nearest subframe including the interference measurement resource may be selected as the CSI reference resource for aperiodic CSI reporting. For example, the CSI reference resource for aperiodic CSI reporting to be transmitted in UL subframe n may be defined by single DL subframe $n-n_{CQI\_ref}$ in the time domain as DL subframe $n-n_{CQI\_ref}$ having minimum $n_{CQI\_ref}$ selected from valid DL subframes including the interference measurement resource among a DL subframe with a UL DCI format including a corresponding CSI request and DL subframes prior to the DL subframe.

Figure 9:
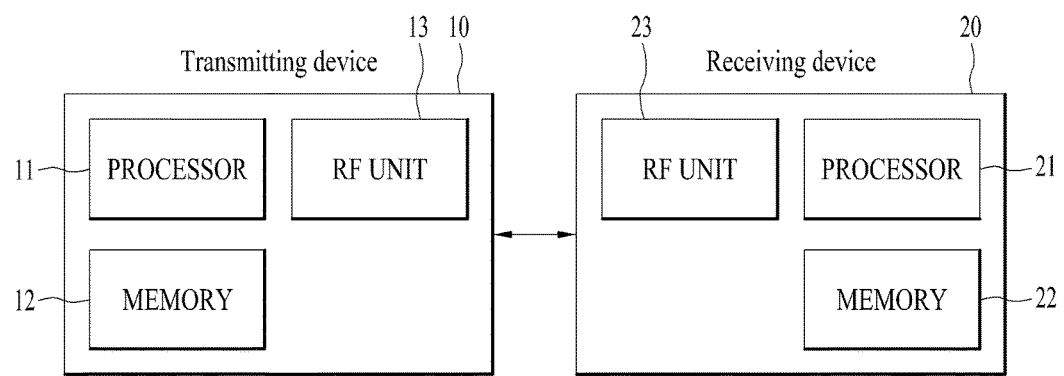
FIG. 9 is a block diagram illustrating elements of a transmitting device 10 and a receiving device 20 for implementing the present invention.

FIG. 9 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, the processor, RF unit, and memory included in the UE will be referred to as a UE processor, a UE RF unit, and a UE memory, respectively, and the processor, RF unit, and memory unit included in the eNB will be referred to as an eNB processor, an eNB RF unit, and an eNB memory, respectively.

The eNB processor and the UE processor according to an embodiment of the present invention are configured to differently interpret a CSI reference resource of an MBSFN subframe according to whether an interference measurement resource is explicitly configured for the UE, i.e. according to whether information including the interference measurement resource is provided to the UE. For example, according to an embodiment of the present invention, when the UE is configured to receive the information indicating the interference measurement resource or when the UE is configured with a transmission mode for performing interference measurement using the explicitly signaled interference measurement resource, the eNB processor and the UE processor consider a subframe corresponding to the CSI reference resource to be a valid DL subframe even though the subframe corresponding to the CSI reference resource is the MBSFN subframe. The UE processor is configured to calculate CSI based on the MBSFN subframe corresponding to the CSI reference resource and controls the UE RF unit to transmit the CSI in UL subframe n associated with DL subframe $n-n_{CQI\_ref}$ which is the MBSFN subframe. Here, $n_{CQI\_ref}$ may be a positive integer greater than a predefined value (e.g. 4). The eNB processor may control the UE RF unit to receive CSI reporting calculated based on DL subframe $n-n_{CQI\_ref}$ in UL subframe n. Even if DL subframe $n-n_{CQI\_ref}$ is the MBSFN subframe, the eNB processor may determine that the CSI reporting indicates CSI for DL physical resource blocks in the MBSFN subframe. For example, the eNB processor may assume that a CQI value included in the CSI reporting is calculated based on the DL physical blocks in the MBSFN subframe.

According to a modified embodiment of the present invention, even if the UE is configured with a CRS based transmission mode, for example, a mode for demodulating a DL signal received through a PDSCH using a CRS, the eNB processor and the UE processor may consider the MBSFN subframe a valid DL subframe for CSI reference source in the case in which the UE should derive channel measurement for CSI calculation based not on the CRS but on a CSI-RS.

According to another modified embodiment of the present invention, when the interference measurement resource is configured for the UE, the eNB processor and the UE processor may determine whether a subframe corresponding to the CSI reference resource is valid for the CSI reference resource according to whether the subframe includes the interference measurement resource. For example, when the interference measurement resource is configured for the UE by higher layer signaling, if a subframe corresponding to the CSI reference resource is a subframe corresponding to the interference measurement resource, the eNB processor and the UE processor may be configured to determine that the corresponding subframe is valid and, if not, the eNB processor and the UE processor may be configured to determine the corresponding subframe is invalid. If the modified embodiment of the present invention for determining that a subframe corresponding to the CSI reference resource is valid only when the subframe includes the interference measurement resource indicated by a higher layer is applied to both periodic CSI reporting and aperiodic CSI reporting, the eNB processor may control the eNB RF unit to transmit an aperiodic CSI request to the UE only in a DL subframe including the interference measurement resource. The UE processor may determine that the aperiodic CSI request has a probability of being received only in the DL subframe including the interference measurement resource and may not expect to receive the aperiodic CSI request in the DL subframe in which the interference measurement resource is not included.

The modified embodiment of the present invention for determining that a subframe corresponding to the CSI reference resource is valid only when the subframe includes the interference measurement resource indicated by a higher layer may be limitedly applied only to periodic CSI reporting. In the case of periodic CSI reporting, the UE processor is configured to perform interference measurement in a subframe including the interference measurement resource and to calculate CSI based on the interference measurement and may control the UE RF unit to transmit the CSI calculated in a UL subframe corresponding to a transmission timing of periodic CSI reporting. In the case of aperiodic CSI reporting, the eNB processor may control the eNB RF unit to transmit an aperiodic CSI reporting request irrespective of whether a DL subframe corresponds to the interference measurement resource. Since the UE processor may control the UE RF unit to receive the aperiodic CSI reporting request in an arbitrary DL subframe, the UE processor may attempt to decode a DCI format for a UL grant including the aperiodic CSI reporting request in every DL subframe. If the UE processor detects the aperiodic CSI reporting request in the DL subframe, the UE processor may be configured to perform interference measurement using the interference measurement resource when the DL subframe includes the interference measurement resource and to perform interference measurement using other resources (e.g. a CRS resource) when the DL subframe does not include the interference measurement resource. That is, the UE processor is configured to calculate CSI based on the DL subframe regardless of whether the DL subframe in which aperiodic CSI reporting is triggered includes the interference measurement resource and may control the UE RF unit to transmit the calculated CSI as a response to the aperiodic CSI reporting request.

Meanwhile, the embodiment in which only a subframe with the interference measurement resource is considered to be valid for the CSI reference resource may be commonly applied to periodic CSI reporting and aperiodic CSI reporting. In this case, the eNB processor and the UE processor do not consider the CSI reference resource for aperiodic CSI reporting to be a subframe in which aperiodic CSI reporting is triggered and may determine that the nearest subframe including the interference measurement resource among subframes prior to the subframe in which aperiodic CSI reporting is triggered is the CSI reference resource for aperiodic CSI reporting.

According to the present invention, accuracy of CSI reporting can be enforced in a multi-cell environment.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a base station, a UE, or other devices in a wireless communication system.

The invention claimed is:

1. A method for controlling channel state information (CSI) reporting by a user equipment, the method comprising:
   receiving, by the user equipment, configuration information of a periodic zero-power CSI-reference signal (CSI-RS) resource;
   receiving, by the user equipment, a control signal requesting an aperiodic CSI at a multimedia broadcast single frequency network (MBSFN) subframe; and
   controlling, by the user equipment, a transmission of the aperiodic CSI for the MBSFN subframe, depending on whether or not the periodic zero-power CSI-RS resource is located in the MBSFN subframe,
   wherein the transmission of the aperiodic CSI for the MBSFN subframe is performed if the periodic zero-power CSI-RS resource is located in the MBSFN, and
   wherein the transmission of the aperiodic CSI for the MBSFN subframe is skipped if the periodic zero-power CSI-RS resource is not located in the MBSFN subframe.

2. The method according to claim 1, wherein the MBSFN subframe includes a cell-specific reference signal (CRS) within first two orthogonal frequency division multiplexing (OFDM) symbols.

3. The method according to claim 2, wherein the periodic zero-power CSI-RS resource is configured to occur with a specific periodicity corresponding to a plurality of subframes.

4. A user equipment for controlling channel state information (CSI) reporting, the user equipment comprising:
a transceiver: and
a processor configured to:
- control the transceiver to receive configuration information of a periodic zero-power CSI-reference signal (CSI-RS) resource,
- control the transceiver to receive a control signal requesting an aperiodic CSI at a multimedia broadcast single frequency network (MBSFN) subframe,
- control a transmission of the aperiodic CSI for the MBSFN subframe, depending on whether or not the periodic zero-power CSI-RS resource is located in the MBSFN subframe,
- perform the transmission of the aperiodic CSI for the MBSFN subframe if the periodic zero-power CSI-RS resource is located in the MBSFN subframe, and
- skip the transmission of the aperiodic CSI for the MBSFN subframe if the periodic zero-power CSI-RS resource is not located in the MBSFN subframe.

5. The user equipment according to claim 4, wherein the MBSFN subframe includes a cell-specific reference signal (CRS) within first two orthogonal frequency division multiplexing (OFDM) symbols.

6. The user equipment according to claim 5, wherein the periodic zero-power CSI-RS resource is configured to occur with a specific periodicity corresponding to a plurality of subframes.

* * * * *